United States Patent [19]

Whittingham

[11] 4,049,887
[45] Sept. 20, 1977

[54] ELECTROCHEMICAL CELLS WITH CATHODE-ACTIVE MATERIALS OF LAYERED COMPOUNDS

[75] Inventor: M. Stanley Whittingham, Fanwood, N.J.

[73] Assignee: Exxon Research & Engineering Co., Linden, N.J.

[21] Appl. No.: 707,091

[22] Filed: July 20, 1976

[51] Int. Cl.$^2$ ............................................. H01M 6/36
[52] U.S. Cl. .................................. 429/112; 429/193; 429/194; 429/218; 429/221
[58] Field of Search ............... 429/218, 221, 193, 194, 429/112, 27-29

[56] References Cited

U.S. PATENT DOCUMENTS 3,956,194  5/1976  Armand ........................... 429/218 X

OTHER PUBLICATIONS

Handbook of Chem. and Physics, 54th Ed. 1973-1974, CRC Press, p. B-98.

*Primary Examiner*—C. F. LeFevour
*Attorney, Agent, or Firm*—Joseph J. Dvorak

[57] ABSTRACT

An improved cathode which contains as a cathode-active material a layered compound of the formula $MA_xB_y$ wherein M is at least one metal selected from the group consisting of iron, vanadium, titanium, chromium and indium, A and B are members selected from the group consisting of chalcogenides and halides, and $x$ and $y$ are numerical values from 0 to 2 with the sum of $x$ and $y$ being substantially equal to about 2, the layered compounds belonging to crystallographic space group $V_H^{13}$. The improved cathode is used with an anode that contains as the anode-active material at least one metal selected from the group consisting of Group IA metals, Group IB metals, Group IIA metals, Group IIB metals, Group IIIA metals and mixtures of the aforesaid metals with other substances such that the aforesaid metals can be electrochemically released from the mixture (lithium is preferred) and an electrolyte which is chemically inert to the anode or cathode materials and which will permit migration of ions from the anode to the cathode. A specific example is a battery prepared by utilizing lithium as the anode-active material and a lithium salt dissolved in dioxolane as the electrolyte.

8 Claims, No Drawings

ELECTROCHEMICAL CELLS WITH CATHODE-ACTIVE MATERIALS OF LAYERED COMPOUNDS

BACKGROUND OF THE INVENTION

The present invention relates to electrochemical cells and more particularly to high energy density electrochemical cells that employ special layered compounds as a cathode-active material.

In U.S. Pat. No. 3,844,837 a high energy density electrochemical cell utilizing intercalation compounds of graphite as the cathode-active material and lithium metal as the anode is disclosed. While such batteries have been cycled, i.e. put through a number of charge and discharge cycles, the cathode-active graphite materials tend to lose their structural integrity rapidly.

In copending application Ser. No. 552,599 filed Feb. 24, 1975 a high energy density electrochemical cell utilizing intercalation compounds of transition metal chalcogenides as the cathode-active material and lithium metal as the anode is disclosed. These metal chalcogenides while useful as cathode-active materials are expensive materials. In contrast thereto, the present invention provides for electrochemical cells which in many cases have not only high energy densities but are also capable of being cycled through charging and discharging and can be produced inexpensively.

BRIEF SUMMARY OF THE INVENTION

Generally speaking, the present invention relates to an improved cathode for electrochemical cells. The improved cathode includes as the cathode-active material at least one layered compound of the formula $MA_xB_y$ wherein M is at least one metal selected from the group consisting of iron, vanadium, titanium, chromium and indium, A and B are members selected from chalcogenides and halides, respectively and $x$ and $y$ are numerical values from 0 to 2 with the sum of $x$ and $y$ being substantially equal to about 2, the layered compounds have structures developed from crystallographic space group $V_H^{13}$, according to the Schoenflies system.

The improved cathodes of the present invention can be used in combination with an anode-active material and an electrolyte to provide high energy density batteries. The anode-active material in such batteries is at least one member selected from the group consisting of Group IA metals, Group IB metals, Group IIA metals, Group IIB metals, Group IIIA metals and mixtures of the aforesaid metals with other substances such that the aforesaid metals can be electrochemically released from the mixture. The improved cathode and the previously described anode-active material are immersed in an electrolyte which is chemically inert to the anode or the cathode active materials and which will permit migration of ions from the anode material to the cathode.

DETAILED DESCRIPTION

In carrying the present invention into practice, an improved cathode contains a cathode-active material which is at least one layered compound having the formula $MA_xB_y$ wherein M is at least one metal selected from the group consisting of iron, vanadium, titanium, chromium and indium, A is a chalcogenide, i.e. an oxide, sulfide, selenide or telluride, B is a halide, i.e. chloride, bromide or iodide and $x$ and $y$ are numerical values from 0 to 2 with the sum of $x$ and $y$ being substantially equal to about 2, the layered compound structures being derived from crystallographic space group $V_H^{13}$.

The cathode structure itself need not necessarily consist of a cathode-active material. The structure can be made of materials such as carbon, copper, nickel, zinc, silver, etc., upon which or in which the cathode-active material is deposited or impregnated. Advantageously, the cathode structure consists entirely of the layered compound when the layered compound displays significant electrical conductivity. Advantageously, the cathode-active material is not admixed or diluted with an electrochemically inactive material or other electrochemically active material except that combinations and solid solutions of the layered compounds can be used to advantage. The cathode structure can be readily fabricated from the cathode-active materials using materials and methods well known in the prior art, e.g., polytetrafluoroethylene, bonding agents or support structures such as nickel or copper mesh, can be used in forming the structure.

The cathode-active material can be any material within the scope of the above definition. Either pure compounds or combinations of the compounds with one another can be used. Preferably, M in the formula $MA_xB_y$ is iron, A is advantageously oxygen, and B is advantageously chlorine and $x$ and $y$ are advantageously 1, i.e. advantageous cathode-active material is ferric oxychloride which has a layered structure that is developed from the space group $V_H^{13}$.

Examples of other cathode-active materials that can be employed include vanadium oxychloride, chromium oxychloride, titanium oxychloride, indium oxychloride, and the corresponding bromides and iodides.

Anode-active materials that can be used with the improved cathode-active material in accordance with the present invention include at least one metal selected from the group consisting of Group IA metals, Group IB metals, Group IIA metals, Group IIB metals, Group IIIA metals and mixtures of the aforesaid metals with other substances such that the aforesaid metals can be electrochemically released from the mixture. Other suitable active materials include materials which are capable of releasing hydrogen and ammonium ions [LaNi$_5$H$_x$ or Hg(NH$_4$)$_x$]. Advantageously, the anode-active material is a Group IA metal such as lithium, sodium and potassium. The anode can also consist entirely of the anode-active material or the anode-active material can be deposited on the supporting structure which in turn can be constructed of materials such as copper, steel, nickel, carbon, etc., which are advantageously electronic conductive but which are not the source of intercalating ions. In some instances, the anode-active material can consist of alloys, compounds or solutions of the above materials provided the alloys, compounds or solutions meet the requirement that they are electronically conductive and are capable of electrochemically releasing ions which are to be reacted into the layered compound of cathode-active material. In those instances where the anode-active material is a metal, such as lithium, it can be advantageous to alloy the metal with other materials such as aluminum in order to minimize dendrite formation and growth during charging.

Electrolytes useful in electrochemical cells in accordance with the present invention comprise a solvent which is chemically inert to the anode and cathode materials and must permit migration of ions from the anode-active material to the cathode-active material and vice versa during the discharge and charging cycles, respectively, and a dissolved ionizable salt that can be conveniently represented by the general formula LZ wherein L is at least one cation moiety selected from the group consisting of Group IA metals, Group IB metals, Group IIA metals, Group IIB metals, Group IIIA metals and ammonium ions (or substituted ammonium ions such as pyridinium) and wherein Z is at least one anionic moiety selected from the group consisting of halides, sulfates, nitrates, phosphofluorides, thiocyanates and perchlorates. Especially advantageous electrolytes include salts of lithium perchlorate, lithium hexafluorophosphate, lithium thiocyanate, ammonia iodide, hydrogen chloride, potassium thiocyanate, potassium chloride and magnesium chloride dissolved in a suitable polar organic solvent such as alcohols, ketones, esters, ethers, organic carbonates, organic lactones, amides, sulfoxides, nitrohydrocarbons and mixtures of such solvents. The concentration of the salt in the electrolyte is determined by the electrolyte conductivity and chemical reactivity. However, in most instances, concentrations between about 0.1 moles per liter and 5 moles per liter of the ionizable salt in the solvent have been found effective. In addition to the foregoing electrolytes, it should be noted that some electrolytes can be used in the pure state (in the form of a solid such as the beta aluminas or in the form of a liquid such as molten alkali metal halides) or may be conveniently dissolved in a suitable solvent.

The layered structure of the cathode-active materials is an important feature of the present invention. Compounds that can be employed as cathode-active materials have structures that are developed from Schoenflyes space group $V_H^{13}$ and are composed of iterative layers bound to each other by van der Waal forces. The individual layers comprise at least one sheet containing metal atoms sandwiched between sheets of non-metal atoms. Intercalation and disintercalation of Lewis bases occur between the iterative layers and it is the weakness of the van der Waal forces binding the layers that allows rapid diffusion of Lewis bases between the layers. The rate of intercalation and disintercalation, which correspond to discharging and charging, respectively, in batteries, is an important factor in determining whether or not the compounds when used as cathode-active materials will display significant concentration polarization at the electrode during the electrochemical processes occuring thereat.

When compounds having the ferric oxychloride structure are used, it can be advantageous to employ other electronic conductors as cathode support materials to increase the current collecting capacity of the cathode structure, particularly when fully charged.

In order to give those skilled in the art a better understanding of the present invention, the following illustrative examples are given:

EXAMPLE 1

FeOCl was prepared by heating together in stoichiometric proportions Fe$_2$O$_3$ and FeCl$_3$ at about 300° C. The product was identified by X-ray analysis. Then 0.4 gm of the FeOCl was allowed to react with 4 mls of a 1.44 molar hexane solution of n-butyl lithium for a week. Thereafter the unreacted n-butyl lithium was recovered, hydrolyzed and the hydrolysate was titrated to determine the amount of n-butyl lithium that was recovered. It was found that 0.44 moles of lithium from the butyl lithium reacted per mole of FeOCl. This demonstrates that FeOCl is able to react with lithium, thus indicating its usefulness in a lithium battery.

EXAMPLE 2

FeOCl was prepared by heating FeCl$_3$ to 200° C and passing water-saturated air over the FeCl$_3$ for 6 hours. The product, FeOCl, was identified by X-ray analysis. Then, FeOCl material so formed was mixed with 10% by weight of carbon and 10% by weight of polytetrafluoroethylene and pressed onto a stainless steel grid first at room temperature and then at 300° C. The grid had just under 2 cm$^2$ of active FeOCl material. A cell was prepared by surrounding the FeOCl with polypropylene separators and then pure lithium metal which served as the anode. This assembly was then immersed into a 2.5 molar solution of lithium perchlorate in dioxolane. The initial open circuit potential was 2.96 volts. The cell was then discharged at a 4mA rate with a cell voltage of 2.1 volts; half the capacity of the cell was obtained above 2.0 volts. The FeOCl was then recharged, following which it was again discharged. This was repeated over 100 times at discharge rates between 4mA and 1mA demonstrating the reversibility of the system.

What is claimed is:

1. An electrochemical cell comprising an anode and cathode; the cathode-active material of said cathode consisting essentially of a layered compound represented by the formula MA$_x$B$_y$ wherein M is at least one metal selected from the group consisting of iron, vanadium, titanium, chromium and indium, A and B are members selected from the chalcogenides and halides, respectively, and the sum of $x$ and $y$ are equal to about 2, the layered compound belonging to space group $V_H^{13}$; and, an electrolyte which is inert to the anode and the cathode, the anode and cathode being immersed in the electrolyte.

2. The electrochemical cell described in claim 1 wherein the anode-active material is at least one member selected from the group consisting of Group IA metals, Group IB metals, Group IIA metals, Group IIB metals, Group IIIA metals and compounds capable of releasing hydrogen or ammonium ions.

3. The electrochemical cell as described in claim 2 wherein the cathode-active material is ferric oxychloride.

4. The electrochemical cell as described in claim 3 wherein the anode-active material is lithium.

5. The electrochemical cell of claim 3 in which the electrolyte is a molten salt.

6. The electrochemical cell of claim 3 in which the electrolyte is a solid.

7. The electrochemical cell as described in claim 4 wherein the electrolyte is a polar organic solvent having an ionizable salt dissolved therein, the ionizable salt being represented by the formula LiZ where Z is an anionic moiety selected from the group consisting of halides, aluminum halides, phosphofluorides, thiocyanates, and perchlorates.

8. The electrochemical cell of claim 7 wherein the electrolyte is a solution of lithium perchlorate dissolved in a polar solvent containing at least one cyclic organic ether.

* * * * *